United States Patent
Asai et al.

[11] Patent Number: 5,158,701
[45] Date of Patent: Oct. 27, 1992

[54] LIQUID-CRYSTAL POLYESTER RESIN COMPOSITIONS

[75] Inventors: Kuniaki Asai, Tondabayashi; Tadayasu Kobayashi; Masaru Ota, both of Tsukuba, all of Japan

[73] Assignee: Sumitomo Chemical Company, Limited, Osaka, Japan

[21] Appl. No.: 669,372

[22] Filed: Mar. 14, 1991

[30] Foreign Application Priority Data

Mar. 30, 1990 [JP] Japan .................. 2-085122

[51] Int. Cl.$^5$ .............. C09K 19/52; C08K 9/02; C08G 63/00
[52] U.S. Cl. ............... 252/299.01; 252/299.5; 523/204; 528/180
[58] Field of Search .......... 252/299.01, 299.5; 423/279; 523/204; 528/180

[56] References Cited

U.S. PATENT DOCUMENTS

| | | | |
|---|---|---|---|
| 4,861,515 | 8/1989 | Minamisawa et al. | 252/299.01 |
| 4,888,127 | 12/1989 | Wada et al. | 252/299.5 |
| 4,925,641 | 5/1990 | Kitamura et al. | 423/279 |
| 4,985,222 | 1/1991 | Hata et al. | 423/279 |

*Primary Examiner*—Robert L. Stoll
*Assistant Examiner*—Shean C. Wu
*Attorney, Agent, or Firm*—Stevens, Davis, Miller & Mosher

[57] ABSTRACT

A liquid-crystal polyester resin composition comprising 30 to 95 wt. % of a liquid-crystal polyester and 70 to 5 wt. % of an aluminum borate whisker. The present invention relates to an improvement in the largest defects of a liquid-crystal polyester, i.e. a large anisotropy and a low weld strength, and the liquid-crystal polyester resin composition of the present invention is useful in producing small-sized parts, parts with thin-wall portions and precision parts having a complicated form.

4 Claims, 1 Drawing Sheet

GATE

LIQUID-CRYSTAL POLYESTER RESIN COMPOSITIONS

BACKGROUND OF THE INVENTION

1. Field of the Invention

The present invention relates to a liquid-crystal polyester resin composition in which the largest defects of the liquid-crystal polyester, i.e. a large anisotropy (difference in properties between the machine direction of a resin and the direction transverse thereto in a molded product) and a low weld strength, have been improved.

2. Prior Art

The liquid-crystal polyester comprises rigid molecules unlike crystalline polyesters such as polyethylene terephthalate and polybutylene terephthalate, so that the molecules do not tangle with one another even in a molten state. Thus, the molecules form polydomains in a crystallized state, and the molecular chains markedly orient in the machine direction by a low shear. For this reason, the liquid-crystal polyester is generally called thermotropic liquid-crystal polymer or melt-type liquid-crystal polymer. Because of this peculiar behavior, this polyester has strong points that the melt flowability is very superior, a molded product having thin-wall portions of about 0.2 to about 0.5 mm in thickness can be easily obtained and besides this molded product has a high strength and a high stiffness. However, it has also defects that the anisotropy is very large and the weld strength is remarkably low.

In order to improve the foregoing defects of the liquid-crystal polyester, it is generally carried out to incorporate glass fibers into the polyester. It is known that when glass fibers are incorporated into the conventional crystalline polyesters, the glass fibers orient in the machine direction to develop anisotropy, but that when glass fibers are incorporated into the liquid-crystal polyester, the orientation of the molecular chains is disturbed by the glass fibers, so that the degree of anisotropy is reduced and also the weld strength is somewhat improved. Such the glass fiber-containing liquid-crystal polyester is mainly used in electronic parts such as coil bobbins, relay parts, connectors, etc. and contributes to miniaturizing the electronic parts and making the wall thereof thinner. However, even this method to incorporate glass fibers into the liquid-crystal polyester is not said to be satisfactory in an effect to improve the anisotropy and the weld strength. Therefore, when this method is applied to the production of the electronic parts, devices are necessary in determining the gate position, etc. Also, there have been problems in applying this method to the production of precision parts having a complicated form.

On the other hand, Japanese Patent Application Kokai No. 61-195156 discloses that when whiskers such as potassium titanate fibers are incorporated into a wholly aromatic polyester of a particular structure showing a thermotropic liquid crystalline property, anisotropy on mold shrinkage is more improved than when glass fibers are incorporated into the polyester. However, even suggestions are not given as to the improvement of the weld strength.

SUMMARY OF THE INVENTION

An object of the present invention is to provide a liquid-crystal polyester resin composition in which the largest defects of the liquid-crystal polyester, i.e. a large anisotropy and a low weld strength, have been improved.

The present inventors have extensively studied to solve the foregoing problems, and as a result have found that the above object can be attained by incorporating aluminum borate whiskers into the liquid-crystal polyester. The present inventors thus attained to the present invention.

The present invention relates to a liquid-crystal polyester resin composition comprising 30 to 95 wt. % of a liquid-crystal polyester and 70 to 5 wt. % of an aluminum borate whisker.

PREFERRED EMBODIMENTS OF THE INVENTION

Figure 1:
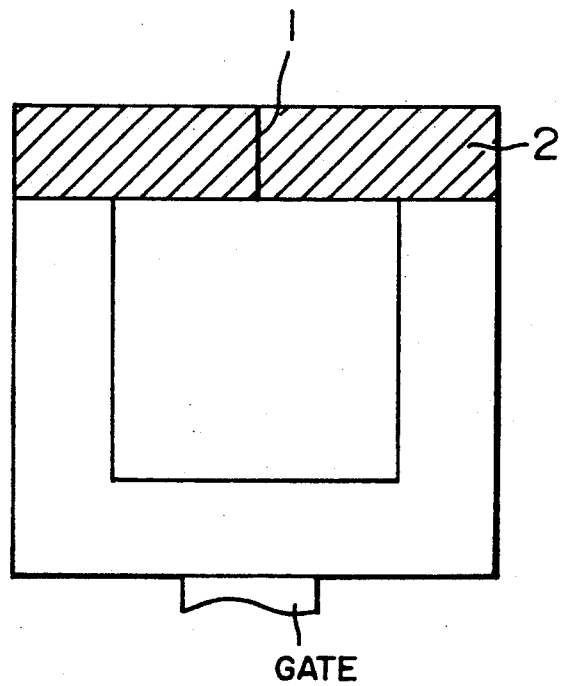
FIG. 1 is a plan view of a test piece for measuring the weld strength.

The liquid-crystal polyester used in the present invention is a polyester called thermotropic liquid-crystal polymer.

It includes:

(1) polyesters prepared from an aromatic dicarboxylic acid or its ester-forming derivative, an aromatic diol or its ester-forming derivative and an aromatic hydroxycarboxylic acid or its ester-forming derivative, (2) polyesters prepared from different kinds of aromatic hydroxycarboxylic acid or their ester-forming derivatives, (3) polyesters prepared from an aromatic dicarboxylic acid or its ester-forming derivative and an aromatic diol substituted at the nucleus or its ester-forming derivative, and (4) polyesters obtained by reacting a polyester (e.g. polyethylene terephthalate) with an aromatic hydroxycarboxylic acid or its ester-forming derivative. These polyesters form a melt showing anisotropy at a temperature of 400° C. or less. The repeating structural unit of the above liquid-crystal polyester includes the following, but it is not limited thereto.

(i) A repeating structural unit derived from an aromatic dicarboxylic acid:

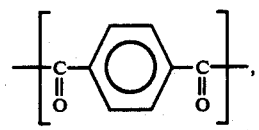

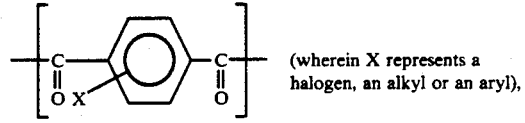

(wherein X represents a halogen, an alkyl or an aryl),

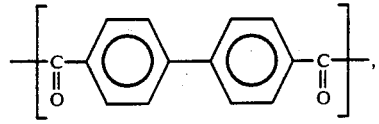

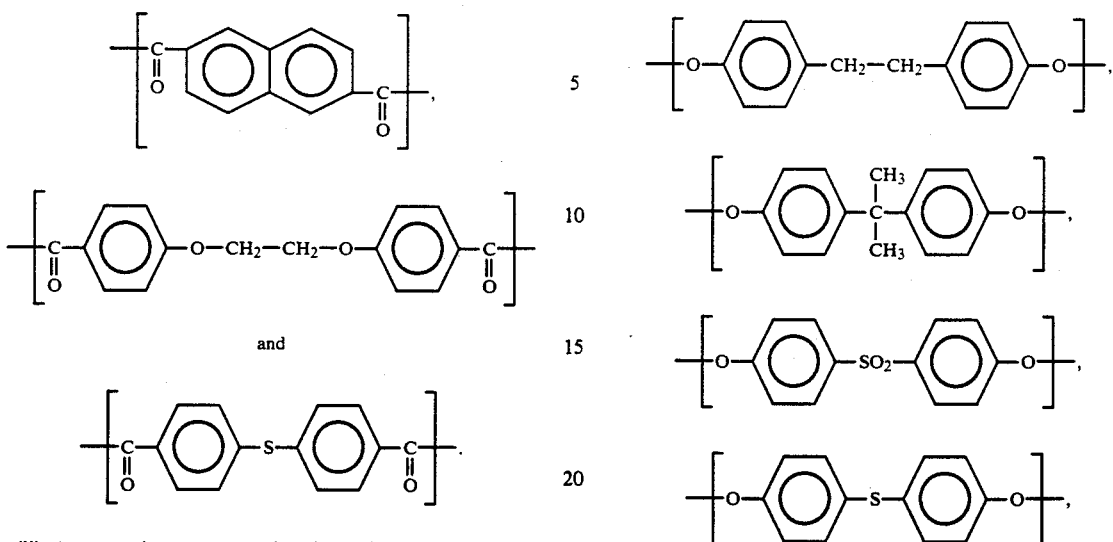
(ii) A repeating structural unit derived from an aromatic diol:
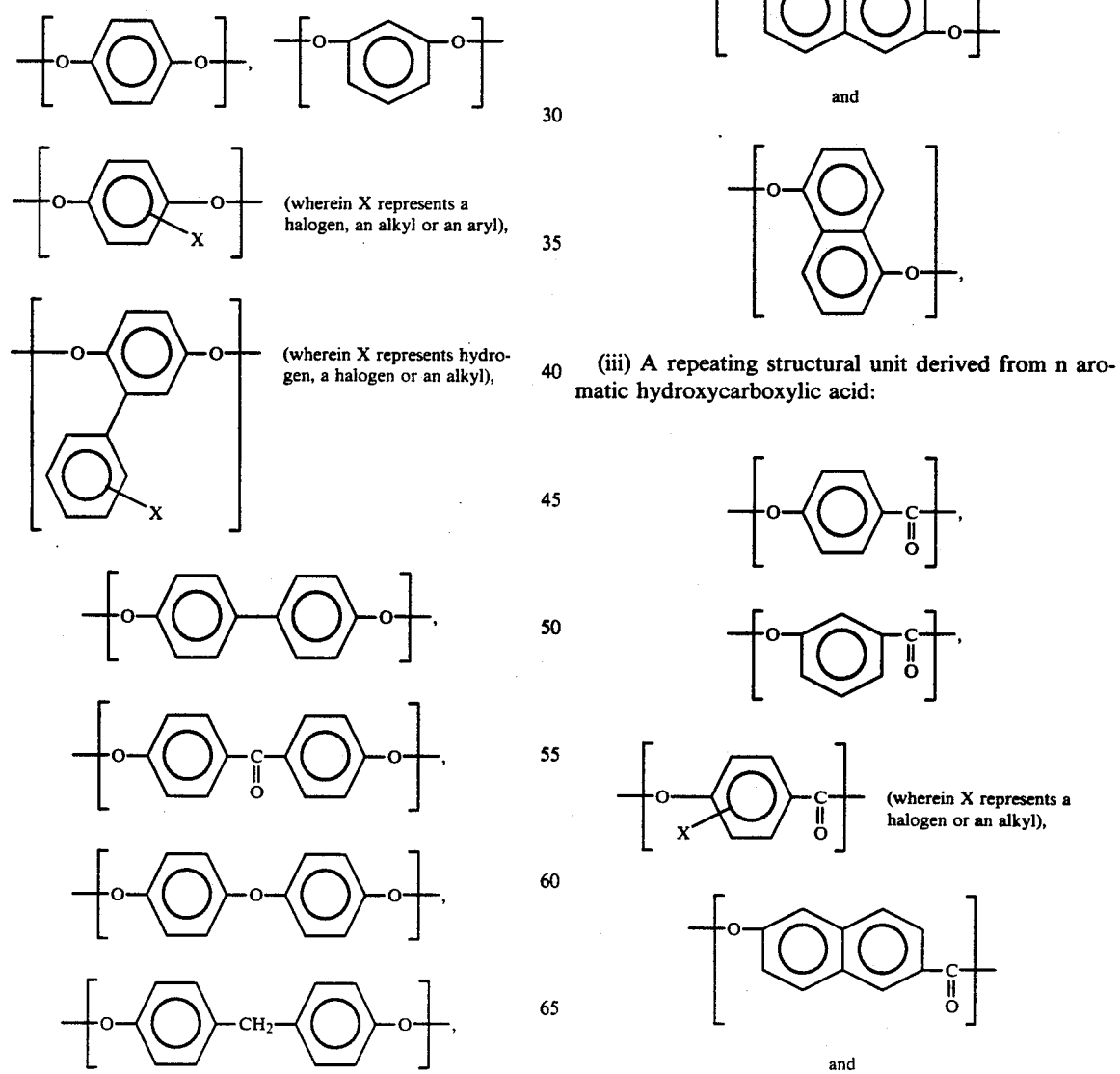
(iii) A repeating structural unit derived from n aromatic hydroxycarboxylic acid:

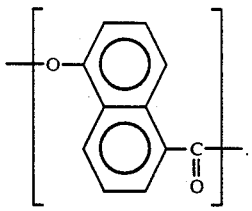

In terms of balance between heat resistance, mechanical characteristics and processability, a particularly preferred liquid-crystal polyester includes those containing a repeating structural unit of

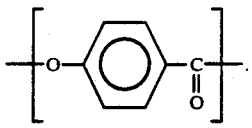

Specifically, it includes those comprising one of combinations (I) to (IV) of the foregoing repeating structural units:

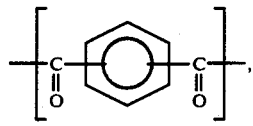

(I)

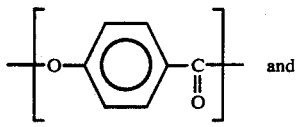
and
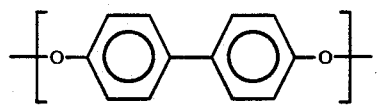

(II)

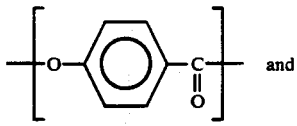
and
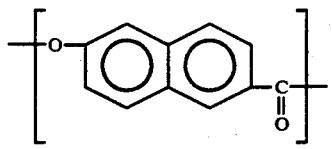

(III)

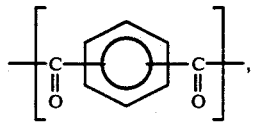
,
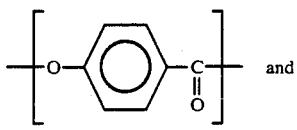
and

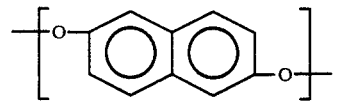

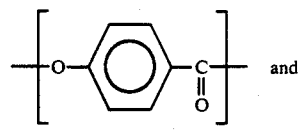
and

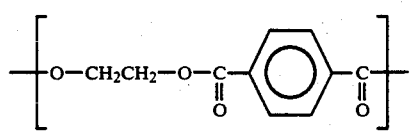

(IV)

The liquid-crystal polyesters having the combinations (I), (II), (III) and (IV) are disclosed, for example, in Japanese Patent Application Kokoku No. 47-47870, No. 63-3888, No. 63-38991 and No. 56-18016, respectively.

The aluminum borate whisker used in the present invention is a white needle-like crystal represented by the chemical formula $9Al_2O_3.2B_2O_3$ or $2Al_2O_3.B_2O_3$, and its average fiber diameter and average fiber length are 0.05 to 5 μm and 2 to 100 μm, respectively.

The aluminum borate whisker represented by the chemical formula $9Al_2O_3.B_2O_3$ has a true specific gravity of 2.93 to 2.95 and a melting point of 1420° to 1460° C. It can be produced by reacting at least one member selected from the group consisting of aluminum hydroxide and inorganic salts of aluminum with at least one member selected from the group consisting of the oxides, oxyacids and alkali metal salts of boron at 900° to 1200° C. in the presence of at least one fusing agent selected from the group consisting of the sulfates, chlorides and carbonates of alkali metals and then allowing the reaction product to grow. The other aluminum borate whisker represented by the chemical formula $2Al_2O_3.B_2O_3$ has a true specific gravity of 2.92 to 2.94 and a melting point of 1030° to 1070° C. It can be produced by carrying out the reaction at a temperature of 600° to 1000° C. using the same components and fusing agent as used in the production of $9Al_2O_3.2B_2O_3$ and then allowing the reaction product to grow.

A preferred aluminum borate whisker is one represented by the chemical formula $9Al_2O_3.2B_2O_3$, and it is put on the market under the trade name of Alborex ® G (produced by Shikoku Kasei Kogyo K.K.). This product has an average fiber diameter of 0.5 to 1 μm and an average fiber length of 10 to 30 μm.

As to the blending ratio of aluminum borate whisker to liquid-crystal polyester, it is desirable that the amount of the liquid-crystal polyester is 30 to 95 wt. % based on the total amount of the both, and that of the aluminum borate whisker is 70 to 5 wt. % based on the same. When the amount of the liquid-crystal polyester exceeds 95 wt. % and that of the aluminum borate whisker is less than 5 wt. %, the effect to improve the anisotropy and weld strength becomes insufficient. On the other hand, when the amount of the liquid-crystal polyester is less than 30 wt. % and that of the aluminum borate whisker exceeds 70 wt. %, dispersion at the time of melt-kneading becomes too insufficient to obtain a uniform composition stably, as a result of which molding becomes difficult. A more preferred amount of the both is 50 to 90 wt. % for the liquid-crystal polyester and 50 to 10 wt. % for the aluminum borate whisker.

So far as the objects of the present invention are not injured, one or more of common additives such as anti-oxidants, heat stabilizers, ultraviolet ray absorbers, coloring agents (e.g. dyes, pigments), mold-release improvers (e.g. fluorine-containing resins), antistatic agents, etc. may be added to the composition of the present invention.

A blending means for obtaining the composition of the present invention is not critical. It is a common practice, however, to mix the liquid-crystal polyester, aluminum borate whisker and if necessary the above additives by means of a Henschel mixer, tumbler, etc. and then melt-knead the resulting mixture on an extruder.

The present invention will be illustrated with reference to the following examples, which are not however to be interpreted as limiting the invention thereto. Physical properties in the examples were measured by the following methods. Flow temperature: Measured with a Koka type flow tester (CFT-500 produced by Shimadzu Seisakusho Ltd.). It is a temperature at which the melt viscosity of a resin is 48,000 poises when the resin is melted by heating it at a rate of temperature increase of 4° C./min and extruded through a nozzle of 1 mm in inner diameter and 10 mm in length under a load of 100 kg/cm$^2$. The lower the flow temperature becomes, the larger the flow-ability of the resin. Optical anisotropy: A powdery resin on a heating stage was melted by heating it at a rate of temperature increase of 10° C./min, and the resulting resin in a molten state was macroscopically observed under a polarized light. When the resin is not fully melted by heating statically on the heating stage, the test was carried out under pressure by applying spring pressure. Anisotropy: Molded products of 64 mm square ×3 mm thick were prepared from the composition of the present invention, and test pieces of 64 mm long ×12 mm wide ×3 mm thick were cut out of the molded products along the machine direction (MD) and the direction transverse thereto (TD), respectively, of the molded products. The flexural strength of these test pieces was measured at a span distance of 40 mm and a bending rate of 2 mm/min, and the anisotropy was represented by the value of (strength in MD)/(strength in TD). The nearer to 1 this value becomes, the smaller the anisotropy. Weld strength: Square molded products of 64 mm (outside dimension)× 38 mm (inside dimension)×3 mm (thickness) shown in FIG. 1 were prepared from the composition of the present invention. A shaded portion 2 (64 mm × 13 mm) containing a weld line 1 shown in FIG. 1 was cut out of the molded product as a test piece, and the flexural strength of the test piece was measured at a span distance of 40 mm and a bending rate of 2 mm/min. Tensile strength and heat distortion temperature (HDT) : A dumbbell-shaped test piece No. 4 for tensile test described in ASTM and a test piece (127 mm long×12.7 mm wide×6.4 mm thick) for HDT measurement were prepared, and the tensile strength and heat distortion temperature were measured using these test pieces according to ASTM D638 and ASTM D648, respectively.

REFERENTIAL EXAMPLE 1

Production of liquid-crystal polyester A 10.8 Kilograms (60 moles) of p-acetoxybenzoic acid, 2.49 kg (15 moles) of terephthalic acid, 0.83 kg (5 moles) of isophthalic acid and 5.45 kg (20.2 moles) of 4,4'-diacetoxydiphenyl were added to a polymerization reactor equipped with a comb-shaped stirring blade. The mixture was heated with stirring under a nitrogen gas atmosphere and polymerized at 330° C. for 1 hour with high-power stirring while removing acetic acid, a by-product, from the reaction system. Thereafter, the system was gradually cooled, and the reaction product was taken out of the system at 200° C. The yield of the reaction product was 13.25 kg, and the theoretical yield was 97.8%. The reaction product was pulverized into particles of 2.5 mm or less in particle size with a hammer mill produced by HOSOKAWA MICRON CORP. The particles were treated at 280° C. for 3 hours in a rotary kiln under a nitrogen gas atmosphere to obtain a particleform wholly aromatic polyester having a flow temperature of 324° C. and comprising the following repeating structural units (hereinafter referred to as liquid-crystal polyester A). This polymer showed optical anisotropy at 340° C. or more under pressure.

The repeating structural units of the liquid-crystal polyester A and their ratio were as follows:

| Repeating structural unit | Ratio |
| --- | --- |
| —[—O—⌬—C(=O)—]— | 60 |
| —[—C(=O)—⌬—C(=O)—]— | 15 |
| —[—C(=O)—⌬—C(=O)—]— | 5 |
| —[—O—⌬—⌬—O—]— | 20 |

REFERENTIAL EXAMPLE 2

Production of Liquid-Crystal Polyester B 8.1 Kilograms (45 moles) of p-acetoxybenzoic acid and 6.9 kg (30 moles) of 6-acetoxy-2-naphthoic acid were added to a polymerization reactor equipped with a combshaped stirring blade. The mixture was heated with stirring under a nitrogen gas atmosphere and polymerized at 300° C. for 30 minutes, at 320° C. for 30 minutes and then at 320° C. for 2 hours under a reduced pressure of 8.0 Torr. During the polymerization, acetic acid, a by-product, was continued to distil out of the reaction system. Thereafter, the system was gradually cooled, and the reaction mixture was taken out of the system at 180° C. The yield of the reaction product was 10.1 kg, and the theoretical yield was 96.2%. After pulverizing the reaction product in the same manner as in Referential Example 1, the resulting pulverized product was treated at 240° C. for 5 hours in a rotary kiln under a nitrogen gas atmosphere to obtain a wholly aromatic polyester having a flow temperature of 260° C. and comprising the following repeating structural units (hereinafter referred to as liquid-crystal polyester B) in the form of particles. This polymer showed optical anisotropy at 320° C. or more when heated statically on the heating stage.

The repeating structural units of the liquid-crystal polyester B and their ratio were as follows:

| Repeating structural unit | Ratio |
| --- | --- |
| 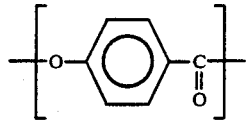 | 60 |
| 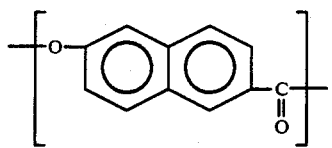 | 40 |

EXAMPLES 1 TO 3 AND COMPARATIVE EXAMPLES 1 AND 2

The liquid-crystal polyester A and an aluminum borate whisker (Alborex ® G produced by Shikoku Kasei Kogyo K.K.) were mixed in respective proportions shown in Table 1 and melt-kneaded at 340° C. through a twin-screw extruder (PCM-30 produced by IKEGAI Iron Works, Ltd.) to obtain pellets. The pellets were molded into test pieces for measuring the anisotropy, weld strength, tensile strength and HDT with an injection molding machine (PS40E 5ASE produced by Nissei Zyushi Kogyo K.K.) at a cylinder temperature of 350° C. and a mold temperature of 130° C. The above physical properties were measured by the methods described above. The results are shown in Table 1.

It is apparent from these results that the compositions of the present invention have a high flexural strength in both MD and TD and an improved anisotropy and a weld strength as compared with those of the composition consisting of the liquid-crystal polyester A alone containing no aluminum borate whisker (Comparative Example 1).

When the amount of the aluminum borate whisker blended exceeded the scope of the present invention (Comparative Example 2), molding was difficult.

COMPARATIVE EXAMPLES 3 AND 4

The same procedure was carried out as in Examples 1 to 3 that the aluminum borate whisker to be incorporated into the liquid-crystal polyester A was replaced by a glass fiber (EFH75-01 produced by Central Glass Fiber Co., Ltd.) and a potassium titanate fiber (HT300 produced by Titan Kogyo K.K.). The results are shown in Table 1.

When the glass fiber was blended (Comparative Example 3), the physical properties of the resulting composition were as follows as compared with a corresponding composition of the present invention (Example 3): The flexural strength in MD was of almost the same level; the flexural strength in TD was however so low that the anisotropy was large and the weld strength also was low.

When the potassium titanate fiber was blended (Comparative Example 4), the physical properties of the resulting composition were as follows as compared with a corresponding composition of the present invention (Example 2): The flexural strength in both MD and TD was low; the anisotropy also was large; and the weld strength also was low.

EXAMPLES 4 TO 6 AND COMPARATIVE EXAMPLES 5 AND 6

The same procedure was carried out as in Examples 1 to 3 except that the liquid-crystal polyester B was used in place of the liquid-crystal polyester A. At that time, melt-kneading on the twin-screw extruder was carried out at 300° C., and injection molding was carried out at a cylinder temperature of 320° C. the results are shown in Table 2.

It is apparent from these results that the compositions of the present invention have a high flexural strength in both MD and TD and an improved anisotropy and a weld strength as compared with those of the composition consisting of the liquid-crystal polyester B alone containing no aluminum borate whisker (Comparative Example 5).

When the amount of the aluminum borate whisker blended exceeded the scope of the present invention (Comparative Example 6), molding was difficult.

TABLE 1

| | Composition (wt. %) | | | Anisotropy Flexural strength (kg/cm$^2$) | | | Weld strength (kg/cm$^2$) | Tensile strength (kg/cm$^2$) | HDT (°C.) |
| --- | --- | --- | --- | --- | --- | --- | --- | --- | --- |
| | Liquid-crystal polyester A | Aluminum borate whisker | Other filler | MD | TD | MD/TD | | | |
| Example 1 | 85 | 15 | — | 1560 | 850 | 1.83 | 1020 | 1930 | 269 |
| Example 2 | 70 | 30 | — | 1750 | 990 | 1.77 | 930 | 1770 | 278 |
| Example 3 | 60 | 40 | — | 1530 | 900 | 1.70 | 820 | 1620 | 280 |
| Comparative Example 1 | 100 | 0 | — | 1310 | 540 | 2.43 | 650 | 1800 | 263 |
| Comparative Example 2 | 25 | 75 | — | Immeasurable because of molding being difficult. | | | | | |
| Comparative Example 3 | 60 | — | Glass fiber, 40 | 1510 | 700 | 2.16 | 750 | 1550 | 280 |
| Comparative Example 4 | 70 | — | Potassium titanate fiber, 30 | 1710 | 910 | 1.88 | 820 | 1880 | 285 |

TABLE 2

|  | Composition (wt. %) | | Anisotropy Flexural strength (kg/cm$^2$) | | | Weld strength (kg/cm$^2$) | Tensile strength (kg/cm$^2$) | HDT (°C.) |
|---|---|---|---|---|---|---|---|---|
|  | Liquid-crystal polyester B | Aluminum borate whisker | MD | TD | MD/TD |  |  |  |
| Example 4 | 85 | 15 | 1580 | 860 | 1.84 | 940 | 2260 | 196 |
| Example 5 | 70 | 30 | 1770 | 980 | 1.81 | 860 | 2150 | 225 |
| Example 6 | 60 | 40 | 1540 | 880 | 1.75 | 780 | 1970 | 227 |
| Comparative Example 5 | 100 | 0 | 1340 | 570 | 2.35 | 420 | 2180 | 183 |
| Comparative Example 6 | 25 | 75 | Immeasurable because of molding being difficult. | | | | | |

What is claimed is:

1. A liquid-crystal polyester resin composition comprising 30 to 95 wt. % of a liquid-crystal polyester and 70 to 5 wt. % of an aluminum borate whisker of which the average fiber diameter and the average fiber length are 0.05 to 5µm and 2 to 100 µm, respectively.

2. A liquid-crystal polyester resin composition according to claim 1, wherein said liquid-crystal polyester is selected from the group consisting of:
   (1) polyesters prepared from an aromatic dicarboxylic acid or its ester-forming derivative an aromatic diol or its ester-forming derivative and an aromatic hydroxycarboxylic acid or its ester-forming derivative,
   (2) polyesters prepared from different kinds of aromatic hydroxycarboxylic acid or their ester-forming derivatives,
   (3) polyesters prepared from an aromatic dicarboxylic acid or its ester-forming derivative and an aromatic diol substituted at the nucleus or its ester-forming derivative, and
   (4) polyesters obtained by reacting a polyester with an aromatic hydroxycarboxylic acid or its ester-forming derivative.

3. A composition according to claim 1, wherein the liquid crystal polyester comprises one selected from the group consisting of (I) a combination of

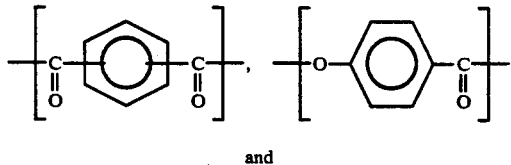

and

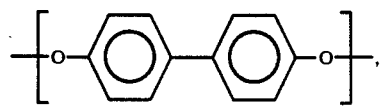

(II) a combination of

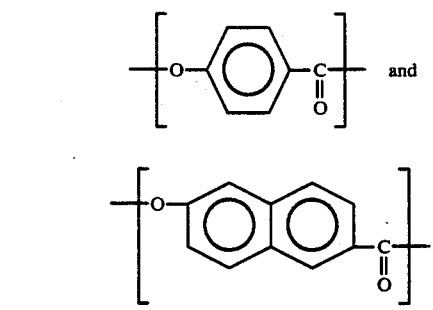

(III) a combination of

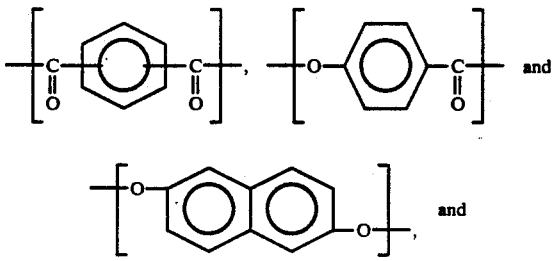

(IV) a combination of

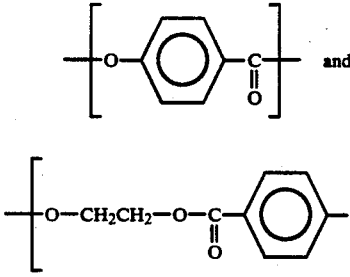

4. A liquid-crystal polyester resin composition according to claim 1, wherein said aluminum borate whisker has a composition represented by the chemical formula $9Al_2O_3 \cdot 2B_2O_3$ or $2Al_2O_3 \cdot B_2O_3$.